(12) United States Patent
Antonatos et al.

(10) Patent No.: US 11,275,732 B2
(45) Date of Patent: Mar. 15, 2022

(54) EXTRACTING DATA UTILITY REQUIREMENTS

(71) Applicant: INTERNATIONAL BUSINESS MACHINES CORPORATION, Armonk, NY (US)

(72) Inventors: Spyridon Antonatos, Dublin (IE); Stefano Braghin, Dublin (IE); Marco Luca Sbodio, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 16/526,674

(22) Filed: Jul. 30, 2019

(65) Prior Publication Data

US 2021/0034608 A1    Feb. 4, 2021

(51) Int. Cl.
| *G06F 7/00* | (2006.01) |
| *G06F 16/245* | (2019.01) |
| *G06N 5/04* | (2006.01) |

(52) U.S. Cl.
CPC ............. *G06F 16/245* (2019.01); *G06N 5/04* (2013.01)

(58) Field of Classification Search
CPC .............................. G06F 16/245; G06N 5/04
USPC .................................................. 707/600–899
See application file for complete search history.

(56) References Cited

U.S. PATENT DOCUMENTS

| 8,838,597 B1 * | 9/2014 | Gottumukkala | ...... G06F 16/901 |
| | | | 707/736 |
| 2015/0150139 A1 | 5/2015 | Pauquet et al. | |
| 2017/0083708 A1 | 3/2017 | Braghin et al. | |
| 2017/0139887 A1 | 5/2017 | Miller et al. | |
| 2018/0218173 A1 | 8/2018 | Perkins et al. | |

* cited by examiner

*Primary Examiner* — Isaac M Woo
(74) *Attorney, Agent, or Firm* — Griffiths & Seaton PLLC

(57) ABSTRACT

Various embodiments are provided for providing intelligent data utility constraint information in a computing environment are provided. One or more utility constraints may be extracted from a dataset and a set of queries and applications to infer one or more data transformations to apply to selected data.

17 Claims, 9 Drawing Sheets

EXTRACTING DATA UTILITY REQUIREMENTS

BACKGROUND OF THE INVENTION

Field of the Invention

The present invention relates in general to computing systems, and more particularly to, various embodiments for extracting data utility requirements from computer programs manipulating data using a computing processor.

Description of the Related Art

Computing systems may be found in the workplace, at home, or at school. Processing devices, with the advent and further miniaturization of integrated circuits, have made it possible to be integrated into a wide variety of devices. In recent years, both software and hardware technologies have experienced amazing advancement. With the new technology, more and more functions are added, and greater convenience is provided for use with these computing systems.

SUMMARY OF THE INVENTION

Various embodiments for providing intelligent data utility constraint information extracted from data in a computing environment are provided. In one embodiment, by way of example only, a method for extracting data utility constraints/requirements from computer programs manipulating data, by a processor, is provided. One or more utility constraints may be extracted from a dataset and a set of queries and applications to infer one or more data transformations to apply to selected data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
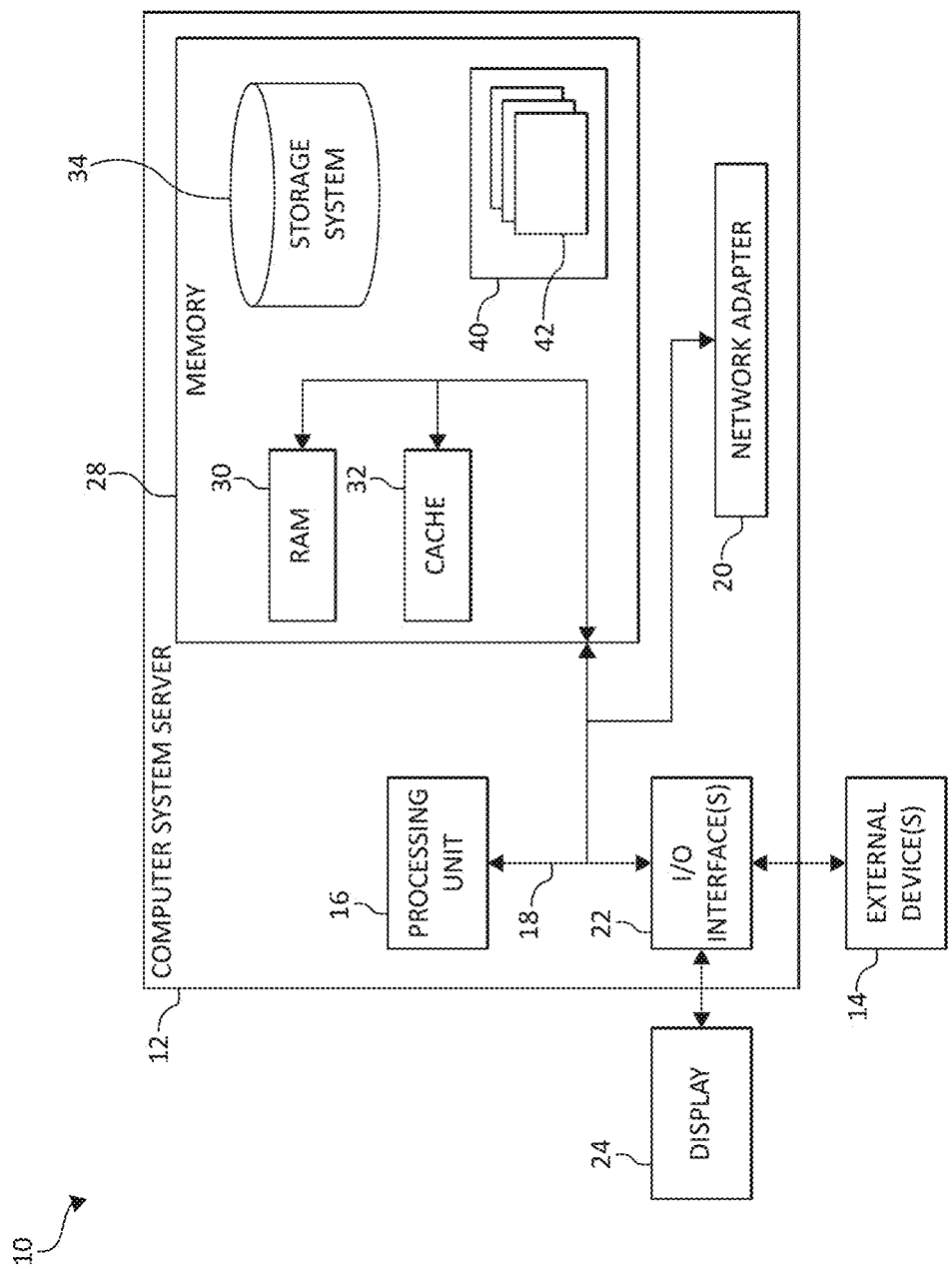
FIG. 1 is a block diagram depicting an exemplary cloud computing node according to an embodiment of the present invention.

In recent years, people have been witnessing a data explosion with data being estimated in the order of zettabytes. Analysing this wealth and volume of data offers remarkable opportunities for growth in various industries and sectors (of types of entities (e.g., companies, governments, academic institutions, organizations, etc.). However, the majority of these datasets (e.g., healthcare data, telecommunication data, banking data, etc.) are proprietary and many contain personal (e.g., personal identifiable information "PII") and/or business sensitive information. Examples of sensitive data include patient records, special housing information, tax records, governmental issued identification numbers (e.g., social security number), banking/financial data numbers (e.g., a bank account number, credit/debit card numbers, etc.), customer purchase records, academic records, mobile call detail records (CDR), etc. This type of data is often considered as private and confidential and should be protected from access by unauthorized users.

In some situations, these various organizations desire to share the datasets with third parties. Due to worldwide privacy regulations governing different types of person-specific data, such as patient data in electronic health records, user data may be required to be anonymized before being shared with third parties. That is, the privacy of individuals is protected by employing anonymization techniques on the original datasets (e.g., masking, k-anonymity, differential privacy, etc.). In some cases, data that may be anonymized data may be needed to share with third parties.

Additionally, entities (e.g., organizations, businesses, institutes, persons) around the world perform anonymization and masking to ensure that sensitive or protected values are not disclosed to minimize a privacy risk. The utility preservation is the dual requirement to maintain as much information, hence value, as possible from the original data. In practice, it is a complex task to clearly identify what are strong utility requirements. Even for simple, but non-trivial use cases (i.e., data extraction tasks), domain experts need to be involved to assess the impact of data transformation to the results of analytics. Relying on domain experts to specify utility requirements for given data processing tasks is both error-prone and does not scale. For example, a human expert may be completely unaware of the analytics workflows (inter- and intra-dependencies) and data transformations involved while also exhausting and consuming valuable time and resource to manually inspect a large collection of scripts working on multiple databases/tables.

Thus, a need exists for a solution to extract utility requirements from data analytic and/or extraction scripts and applications. Accordingly, various embodiment as described herein provide for extracting data utility requirements from computer programs manipulating data. One or more utility constraints may be extracted from a dataset and one or more queries and applications to infer one or more data transformations to apply to selected data. It should be noted that the term "utility requirements" refers to the minimum set of characteristics that data should have in order to be considered usable and useful for a given set of applications/tasks.

In one aspect, the present invention provides a data privacy that provides for both privacy constraints and utility constraints. The privacy constraints are generally provided by government bodies and organizations, and consist of, for example, minimum cluster size and minimum generalization of sensitive attributes. The utility constraints may include allowed transformation that will not affect the utility of the data and/or the results of analytics applied to the data. Specifically in case of impact on analytics, utility constraints, which may be dependent on domain expert's knowledge (even assuming the domain expert's knowledge is accurate/inaccurate or reflecting the objective needs of the workload). Thus, the present invention performs the extraction of utility constraints from one or more applications/tasks that are to be executed on a dataset, which may be a shared dataset.

In an additional aspect, the present invention may use and/or apply (e.g., privacy constraints) one or more utility constraints on data read to prevent unauthorized users to access selected data/raw data (e.g., classified/private data). The protected data may be transformed according to one or more data security rules, policies, and/or requirements while also applying the utility constraints that are extracted from a dataset and one or more queries and applications to infer one or more data transformations to apply to selected data without affecting the result of the one or more queries.

For example, if the classified/private data is detected the present invention replaces the classified/private data (e.g., sensitive information) with non-classified/non-private data (e.g., non-sensitive information) preserving the data length and format of the original values. Alternatively, the data may be transformed/anonymized with data that is transformed into generic values, hash values, and/or other means to protect, transform, or preserved the data integrity/privacy using the extracted utility constraints.

Thus, the mechanisms of the illustrated embodiments may perform an extraction of utility constraints from an applications/tasks that are going to be executed on a "to-be-shared" dataset for inferring functional constraints from the data and enhance data privacy. More specifically, the present invention may 1) implement and use a utilizing schema constraint extractor to analyze database/dataset schema, relationships between data and outputs cardinality, referential integrity and nullability constraints from data and metadata, 2) employ and use a query parser that may receive and analyze input in the form of query plan as sequence of data access/data workflow and associated transformations, and 3) analyze schema/functional constraints and data access/transformation of the application to infer the transformations that can be safely applied to the data without affecting the output of the application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
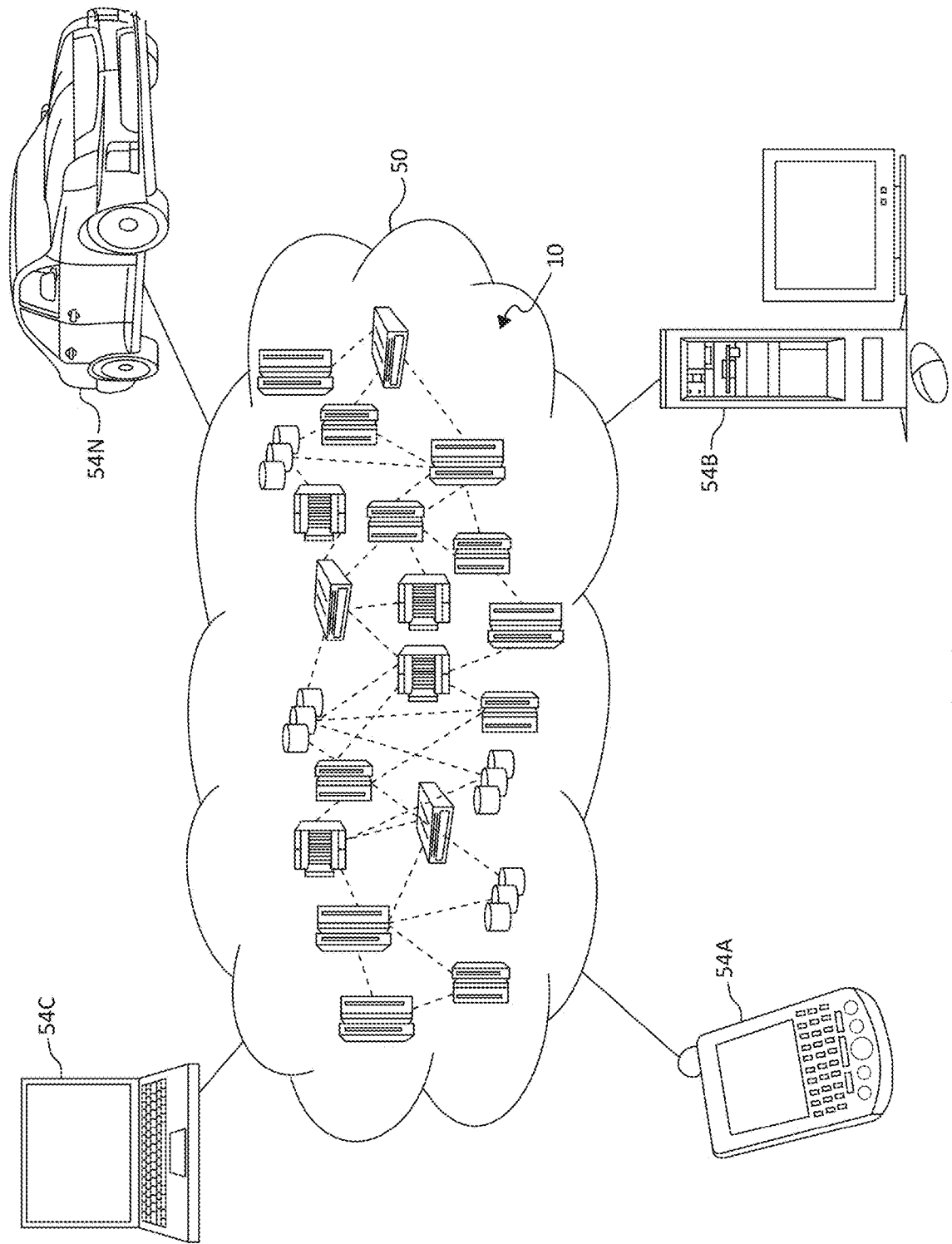
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
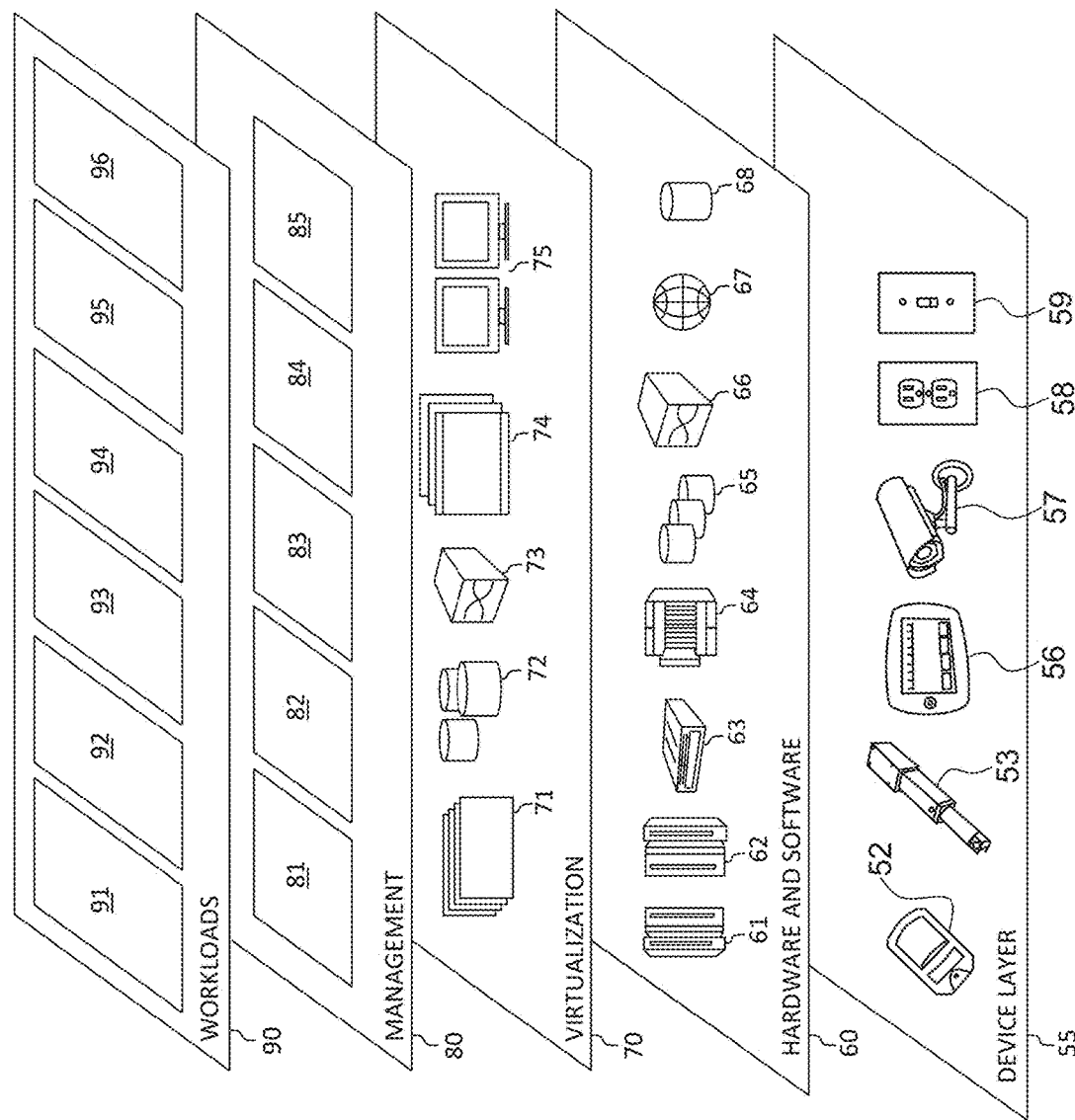
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for extracting data utility constraints/requirements. In addition, workloads and functions 96 for extracting data utility requirements may include such operations as data analysis (including data collection and processing) and data analytics functions. One of ordinary skill in the art will appreciate that the workloads and functions 96 for extracting data utility constraints/requirements may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
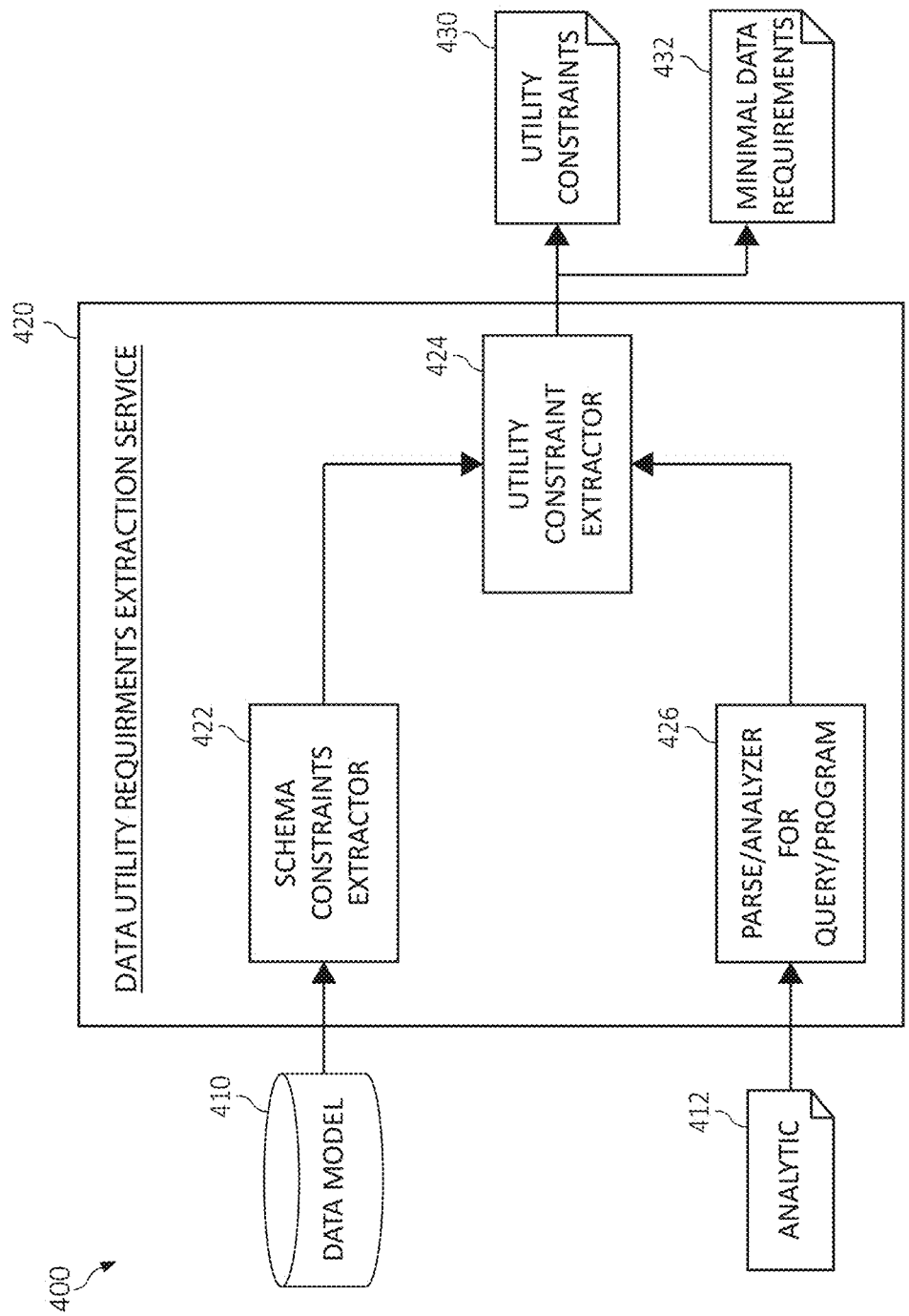
FIG. 4 is an additional block diagram depicting various computing components functioning in accordance with aspects of the present invention.

Turning now to FIG. 4, a block diagram depicting exemplary functional components 400 according to various mechanisms of the illustrated embodiments is shown for extracting data utility constraints/requirements from computer programs manipulating data in a computing environment. In one aspect, one or more of the components, modules, services, applications, and/or functions described in FIGS. 1-3 may be used in FIG. 4.

A data utility requirements extraction service 420 is shown, which may incorporate and/or be included within computer system/server 12, as described in FIG. 1. The data utility requirements extraction service 420 may include a schema constraint extractor 422, a parser/analyzer 426 for a query, program, and/or task, and a utility constraint extractor 424.

In operation, the schema constraint extractor 422 may analyze data 410 (e.g., analyze a data model, a database/dataset schema, one or more relationships between data) and output, among others, cardinality, referential integrity and nullability constraints from data and metadata. That is, the schema constraint extractor 422 may analyze data and schema information to extract and/or infer referential integrity constraint (i.e., if a field of a table is referring a field of another table such as, for example, and identifier "ID" in a table that is used as reference in another table when referring to that value) while nullability constraint (i.e., whether a field can be null or empty). The "cardinality" refers to a distribution of values appearing in each field (i.e. whether rare values appear and/or if they are all distinct, etc.). The cardinality may indicate a field containing a unique ID (e.g., such as, for example, a unique ID used in a referential integrity constraint) or sensitive values. In one aspect, the schema constraint extractor 422 may leverage of one or more tools that extract functional dependencies from the data 410 (e.g., a database schema/data).

The parser/analyzer 426 for a query, program, and/or task may receive, as input various analytics 412 such as, for example, either: 1) a query to process and produce as output a query plan as sequence of data access and associated transformations, and/or 2) an application program (either source code or binary) execute on the data 410 and produce as output the data workflow as sequence of data access and associated transformations. The parser/analyzer 426 for a query, program, and/or task may be obtained from any database engine such as, for example, components provided by a Hyper Structured Query Language Database ("HSQLDB").

The utility constraint extractor 424 may analyze both schema/functional constraints of the data 410 from the schema constraint extractor 422 and data access/transformation of an application (received from the parser/analyzer 426) in order to infer what utility constraints 430 (e.g., transformations) may be safely applied to the data 410 while not affecting the output of the application. Additionally, the utility constraint extractor 424 may identify a minimum set of data requirements 432 (e.g., data attributes) required by the application to operate correctly and also a set of data fields that are accessed directly or indirectly by the application.

In one aspect, the utility constraint extractor 424 may be an inference engine that reasons on the output of the parser/analyzer 426 and highlights which fields need to be projected from the data 410 (e.g., a database), what transformations are to be applied, and then combines this output with information obtained from the schema constraint extractor 422 in terms of which additional fields/table are required to satisfy relational integrity.

Thus, the output of both the schema constraint extractor 422 and the utility constraint extractor 424, extracting the functional constraints of the data 410 generated by the schema constraint extractor 422 and data access/transformation generated by the parser/analyzer 426, is a generated output of a set of utility constraints characterizing the minimum set of columns/attribute required to correctly execute the program manipulating the dataset and the minimum specificity level required for each column/attribute.

As one of ordinary skill in the art will appreciate, the depiction of the various functional units in the data utility requirements extraction service 420 is for purposes of illustration, as the functional units may be located within the data utility requirements extraction service 420 or elsewhere within and/or between distributed computing components.

As one of ordinary skill in the art will appreciate, the data utility requirements extraction service 420 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5A:
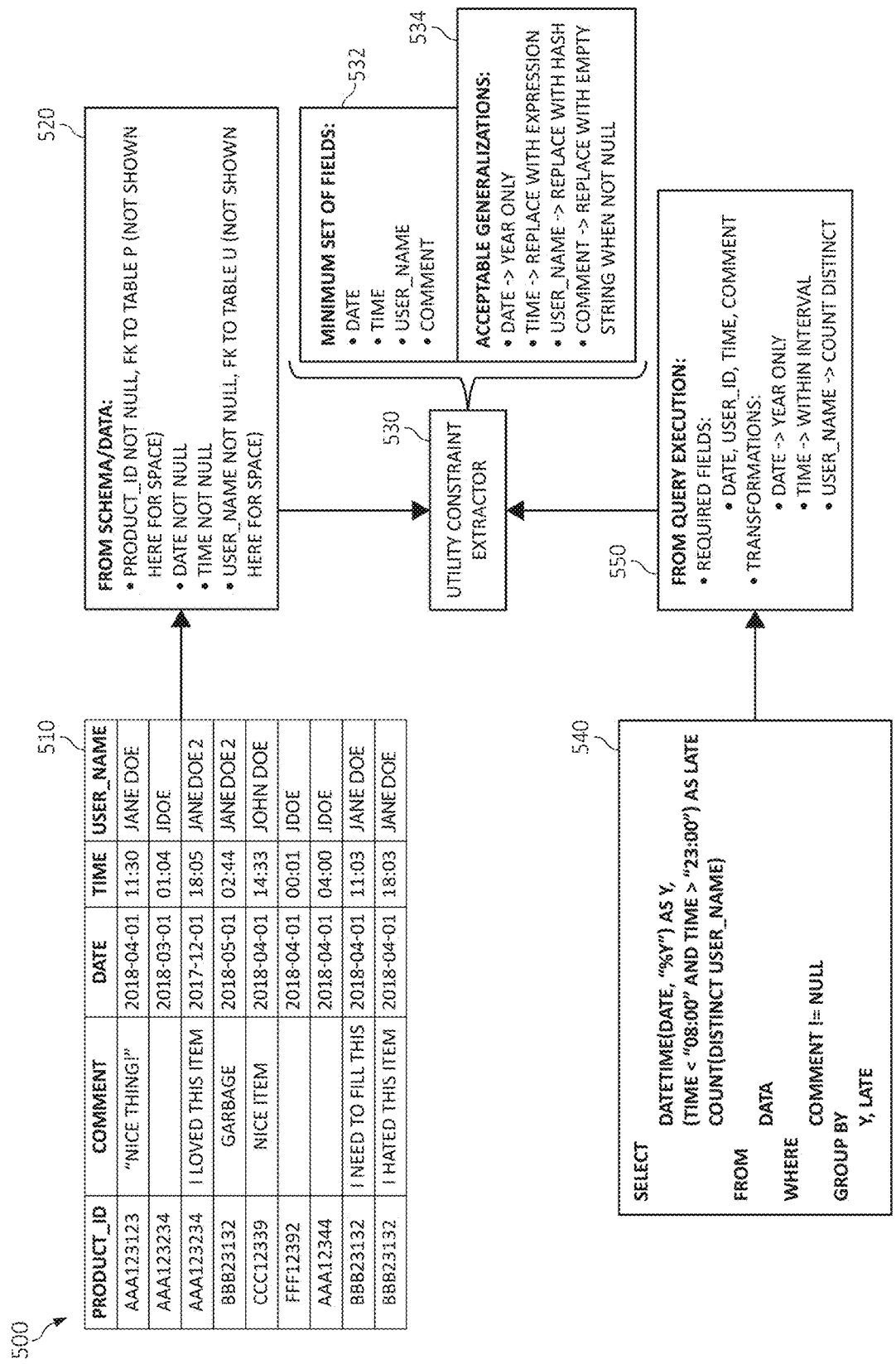
FIG. 5A-5C are diagrams depicting exemplary operations for extracting data utility requirements from computer programs manipulating data in accordance with aspects of the present invention.
Figure 5B:
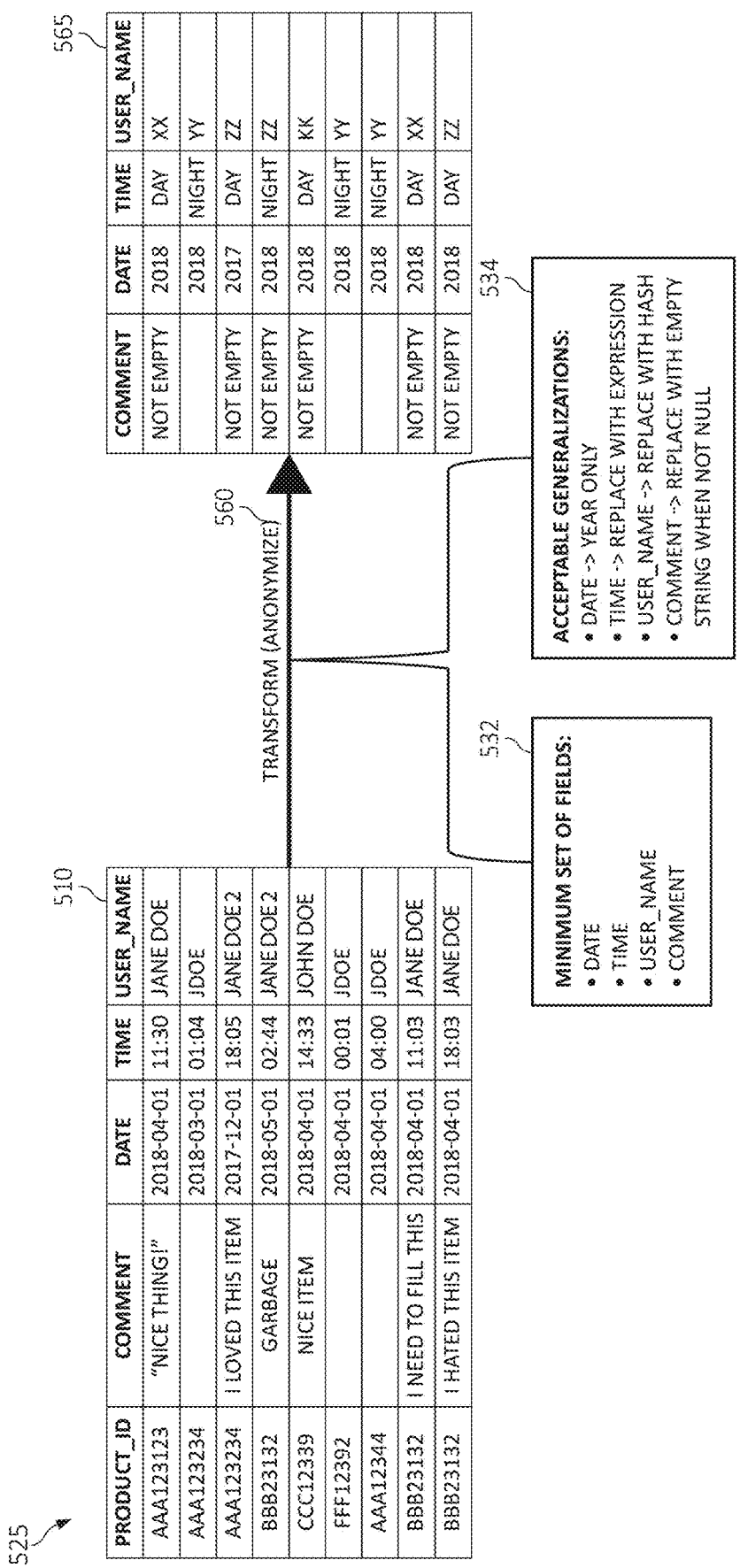
Figure 5C:
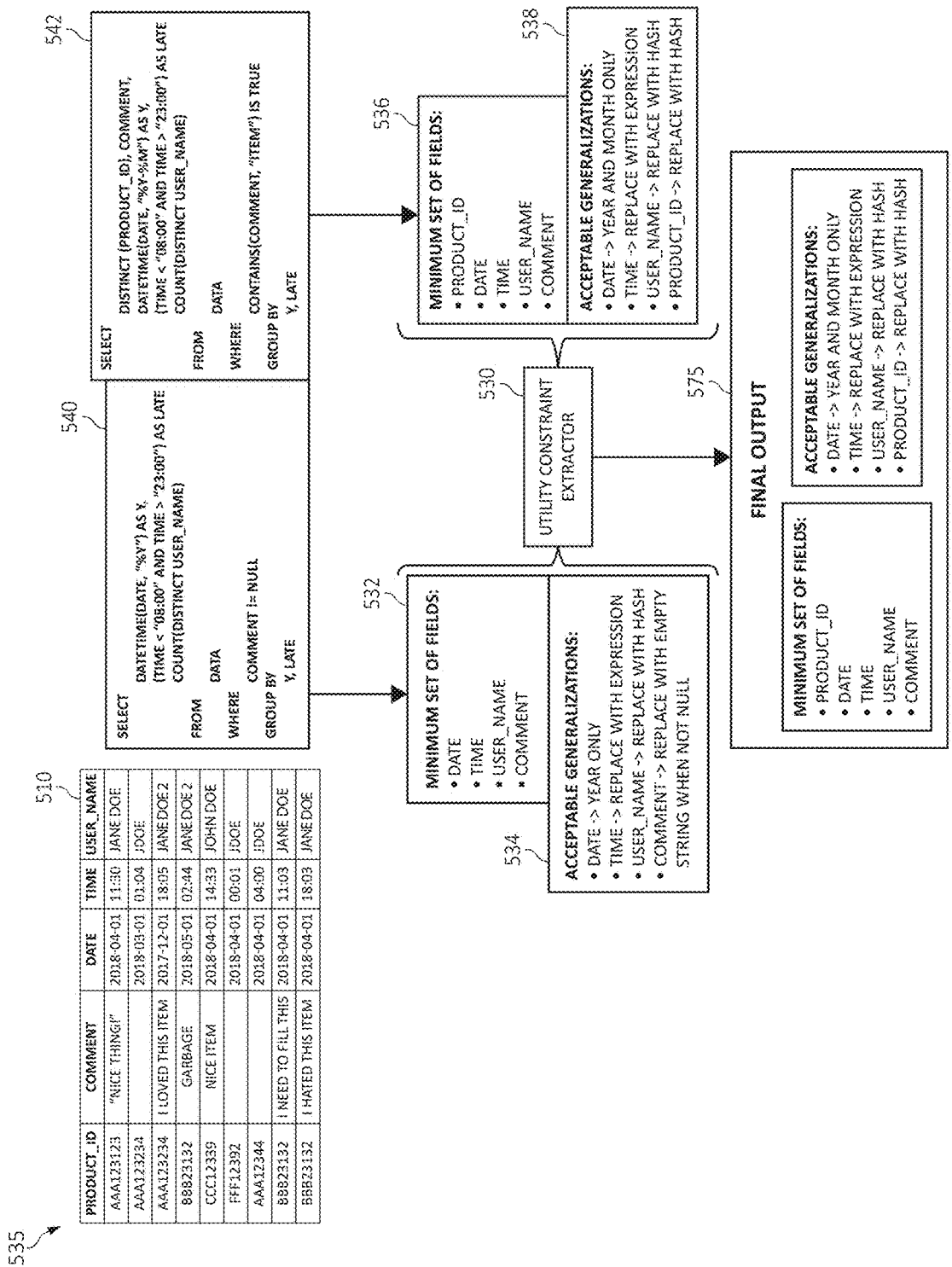

In view of the foregoing, consider the following operation example illustrated in FIGS. 5A-5C of the implementation of the aforementioned functionality. Turning now to FIG. 5, an exemplary operation for operations for extracting data utility requirements from computer programs manipulating data in a computing environment is depicted, in which various aspects of the illustrated embodiments may be implemented. Also, one or more components, functionalities, and/or features of FIGS. 1-4 may be implemented in FIG. 5A-5C. Repetitive description of like elements, components, modules, services, applications, and/or functions employed in other embodiments described herein is omitted for sake of brevity.

As shown, the various blocks of functionality are depicted with arrows designating the blocks' 500, 525, 535 relationships with each other and to show process flow. Additionally, descriptive information is also seen relating each of the functional blocks 500, 525, 535. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing.

Turning now to FIG. 5A and starting in a data set 510 (e.g., a table or database), the data set 510 includes various fields (e.g., product identifier ("ID") a comment, a data, time, and a user name. A minimum set of information 520 may be extracted from the data set 510 (e.g., schema/data). The data set 510 and the query 540 may be used together to extract one or more minimum requirements. For example, from the data set 510, various data may be extracted such as, for example, a primary key ("PK") of the data set 510, one or more foreign keys ("FK"), those fields that are "null," fields that are "non null," and other information that is a minimal amount to extract.

A query 540 is also provided such as, for example, a query that requests a type of comment for a particular product ID at a selected period of time. For example, from the query execution, the query extraction information 550 may be information extracted from one or more required fields (e.g., data, user_ID, time, and/or comments.

The transformations may only require the year for the data, the time may be within the defined interval (e.g., between 08:00 and 23:00), and the user name in only required for a distinct count.

The utility constraint extractor 530 may use the minimum set of information 520 and the query extraction information 550 to generate: 1) a minimum set of fields 532 having a) data, b) time, c) user-name, and/or d) a comment, and an acceptable generalization 534, which indicates that a) the data is only the year, b) the time is replaced with an expression, c) the user names may be transformed by being replaced with a hash, and/or 5) a comment that may be replaced with an empty string (when the comment field is not set to "not null.").

Thus, as depicted in FIG. 5B, using the minimum set of information 520 and the query extraction information 550, the data set 510 may be transformed/anonymized, as in block 560, using the extracted utility constraints from a data set 510 and the query 540 (and application/analytics) to infer and apply one or more data transformations to apply to selected data to generate the anonymized data set 565 (e.g., a database or table). For example, in the first row of the anonymized data set 565, the product ID is transformed to "not empty" (indicating the protected data is available but has been transformed), the data is only provided as the year (e.g., 2018), the time is provided as ("day" which anonymized options are either day or night), and the user name is protected using generic "XX" to protect the name of the user. Thus, by using the minimum set of information 520 and the query extraction information 550, which are the extracted utility constraints from the data set 510 and a query 540 (which may include analytics/applications), the data may be transformed/anonymized without negatively affecting the output of the query 540.

By applying the acceptable generalization and removing those fields that are "null" (e.g., not required), the data/information contained in the data set 510 is reduced to the anonymized data set 565 within changing or negatively impacting the results of the query 540. Said differently, executing the query on either the data set 510 and/or the anonymized data set 565 outputs the same results of the query (except for the anonymized data set 565 yields the transformed/anonymized data according to the extracted utility constraints).

As illustrated in FIG. 5C, the present invention may also apply to a set of queries such as, for example, the query 540 and a second query 542. The second query 542 may also be a query that requests a type of comment for a particular product ID at a selected period of time. In one aspect, one or more fields such as, for example, may be requested in both queries. Thus, given that various fields such as, for example, the "comment" field in both the query 540 and the second query 542 are both required but also may have conflicting requirements for the column "comment," that utility constraint extractor 530 may not be generalize that particular field/column.

However, upon extracting the utility requirements from the data set 510 and the second query 542, the second minimum set of fields 536 for the second query 542 indicates the product ID, the data, time, the user name, and comment. The acceptable generalizations 538 for the second query 542 indicates that the data may require the month and the year, the time may be replaced using a selected expression (e.g., day or night), the user name may be replaced with a hash, and the product ID may also be transformed/replaced with a hash.

Thus, because the second query 542 requires a particular field (e.g., a "product_id"), the utility constraint extractor 530 (see also the utility constraint extractor 424) may add its hash replacement to the list of acceptable generalizations. Accordingly, the final output 575 of the transformed/anonymized data for both the query 540 and the second query 542 may be differentiated with the date in the first query 540 is generalized to year and in the second query 542 is generalized to year and month. The remaining information may be similarly transformed/anonymized such as, for example, as previously described in data set 565.

Figure 6:
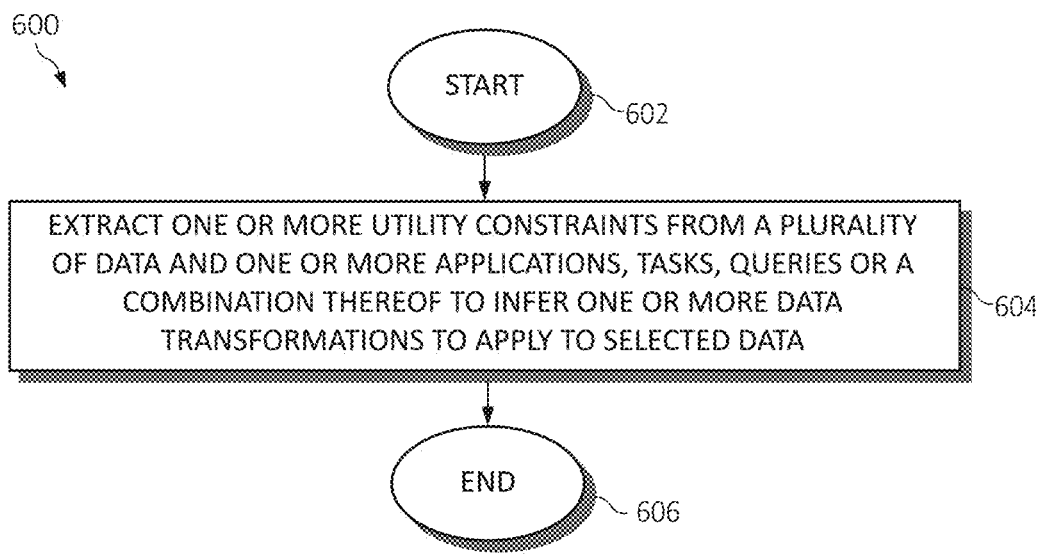
FIG. 6 is a flowchart diagram depicting an exemplary method for extracting data utility constraints/requirements from computer programs manipulating data in a computing environment in a computing environment in which aspects of the present invention may be realized.

Turning now to FIG. 6, a method 600 for extracting data utility requirements from computer programs manipulating data in a computing environment is depicted, in which various aspects of the illustrated embodiments may be implemented. The functionality 600 may be implemented as a method executed as instructions on a machine, where the instructions are included on at least one computer readable storage medium or one non-transitory machine-readable storage medium. The functionality 600 may start in block 602.

One or more utility constraints may be extracted from a dataset and a set of queries and applications to infer one or more data transformations to apply to selected data, as in block 604. The functionality 600 may end in block 606.

Figure 7:
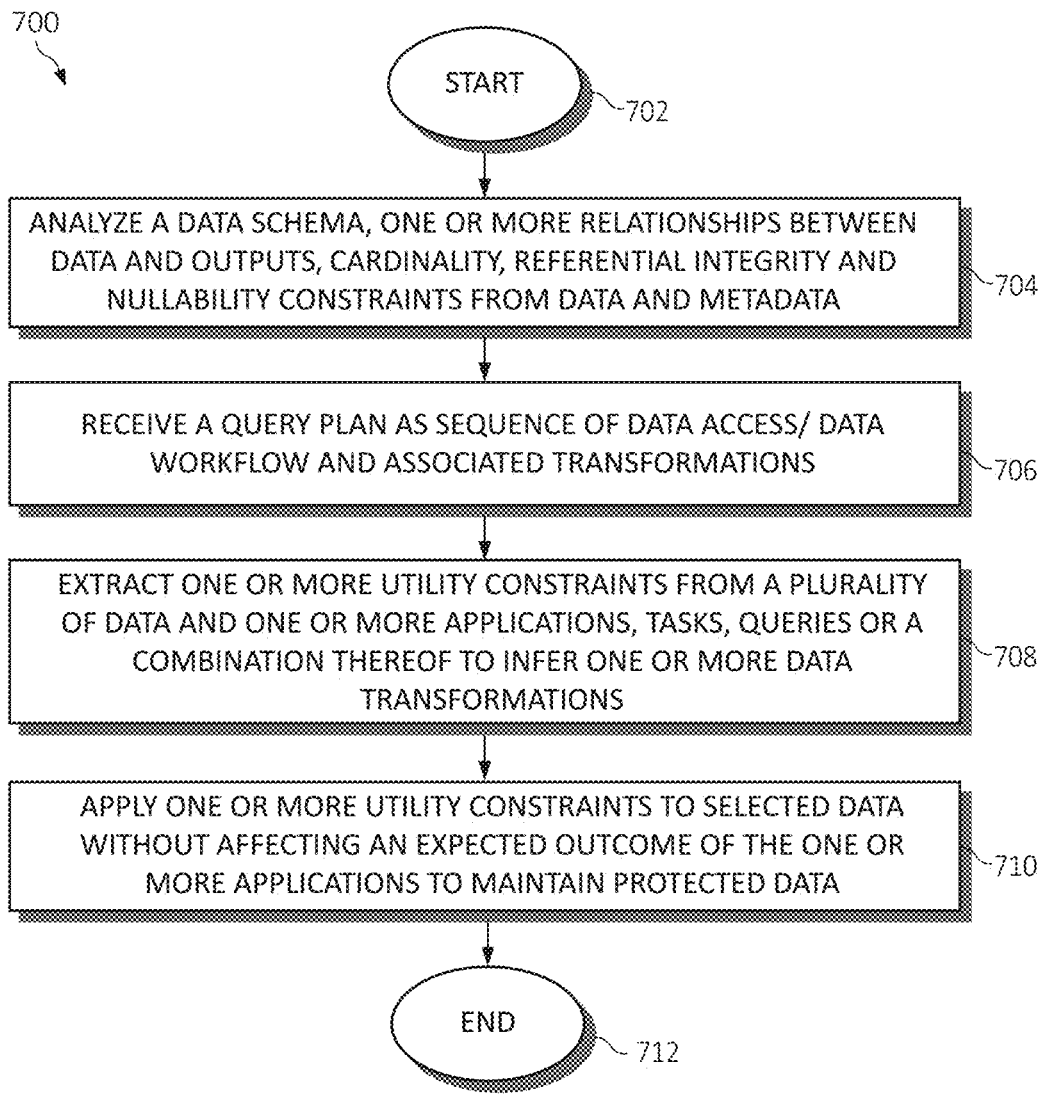
FIG. 7 is an additional flowchart diagram depicting an exemplary method for extracting data utility constraints/requirements from computer programs manipulating data in a computing environment in a computing environment in which aspects of the present invention may be realized.

Turning now to FIG. 7, an additional method 700 for extracting data utility requirements from computer programs manipulating data in a computing environment is depicted, in which various aspects of the illustrated embodiments may be implemented. The functionality 700 may be implemented as a method executed as instructions on a machine, where the instructions are included on at least one computer readable storage medium or one non-transitory machine-readable storage medium. The functionality 700 may start in block 702.

A data schema, one or more relationships between data and outputs cardinality, referential integrity and nullability constraints may be analyzed from data and metadata, as in block 704. A query plan may be received as a sequence of data access/data workflow and associated transformations, as in block 706. One or more utility constraints may be extracted from a plurality of data and one or more applications, tasks, queries or a combination thereof to infer one or more data transformations, as in block 708. One or more utility constraints may be applied to selected data without affecting an expected outcome of the one or more applications to maintain protected data, as in block 710. The functionality may end as in block 712.

In one aspect, in conjunction with and/or as part of at least one block of FIGS. 6-7, the operations 800 may include one or more of each of the following. The operations of 600 and/or 700 may apply the one or more data transformations to the selected data according to the one or more utility constraints. The operations of 600 and/or 700 may identify the one or more utility constraints as a defined set of data characteristics useful for one of a plurality of applications or tasks.

The operations of 600 and/or 700 may analyze the dataset and one or more relationships between the plurality of data, identify the one or more utility constraints from one or more functional dependencies between one or more data fields to identify, replace the selected data with anonymized data according to the one or more data security policies or rules, and/or filter the selected data relating to the write operation or the read operation according to the one or more data security policies or rules.

The operations of 600 and/or 700 may define the one or more data security policies or rules to include types and formats of data, define the one or more data security policies or rules to one or more operations to perform, and/or apply the one or more data security policies or rules to the write operation or the read operation using a machine learning operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing intelligent data utility constraint information in a computing environment, comprising:
    defining one or more data security policies or rules to include types and formats of data;
    defining the one or more data security policies or rules to one or more operations to perform; and
    extracting one or more utility constraints from a dataset and a set of queries and applications to infer one or more data transformations to apply to selected data, wherein the one or more data transformations are applied to the selected data by applying the one or more data security policies or rules to a write operation or a read operation using a machine learning operation.

2. The method of claim 1, further including applying the one or more data transformations to the selected data according to the one or more utility constraints.

3. The method of claim 1, further including identifying the one or more utility constraints as a defined set of data characteristics useful for one of a plurality of applications or tasks.

4. The method of claim 1, further including analyzing the dataset and one or more relationships between the plurality of data.

5. The method of claim 1, further including identifying the one or more utility constraints from one or more functional dependencies between one or more data fields to identify.

6. The method of claim 1, further including:
  replacing the selected data with anonymized data according to the one or more data security policies or rules; or
  filtering the selected data relating to a write operation or a read operation according to the one or more data security policies or rules.

7. A system for providing intelligent data utility constraint information in a computing environment, comprising:
  one or more computers with executable instructions that when executed cause the system to:
    define one or more data security policies or rules to include types and formats of data;
    define the one or more data security policies or rules to one or more operations to perform; and
    extract one or more utility constraints from a dataset and a set of queries and applications to infer one or more data transformations to apply to selected data, wherein the one or more data transformations are applied to the selected data by applying the one or more data security policies or rules to a write operation or a read operation using a machine learning operation.

8. The system of claim 7, wherein the executable instructions apply the one or more data transformations to the selected data according to the one or more utility constraints.

9. The system of claim 7, wherein the executable instructions identify the one or more utility constraints as a defined set of data characteristics useful for one of a plurality of applications or tasks.

10. The system of claim 7, wherein the executable instructions analyze the dataset and one or more relationships between the plurality of data.

11. The system of claim 7, wherein the executable instructions identify the one or more utility constraints from one or more functional dependencies between one or more data fields to identify.

12. The system of claim 7, wherein the executable instructions:
  replace the selected data with anonymized data according to the one or more data security policies or rules; or
  filter the selected data relating to a write operation or a read operation according to the one or more data security policies or rules.

13. A computer program product for, by a processor, providing intelligent data utility constraint information in a computing environment, the computer program product comprising a non-transitory computer-readable storage medium having computer-readable program code portions stored therein, the computer-readable program code portions comprising:
  an executable portion that defines one or more data security policies or rules to include types and formats of data;
  an executable portion that defines the one or more data security policies or rules to one or more operations to perform; and
  an executable portion that extracts one or more utility constraints from a dataset and a set of queries and applications to infer one or more data transformations to apply to selected data, wherein the one or more data transformations are applied to the selected data by applying the one or more data security policies or rules to a write operation or a read operation using a machine learning operation.

14. The computer program product of claim 13, further including an executable portion that applies the one or more data transformations to the selected data according to the one or more utility constraints.

15. The computer program product of claim 13, further including an executable portion that identifies the one or more utility constraints as a defined set of data characteristics useful for one of a plurality of applications or tasks.

16. The computer program product of claim 13, further including an executable portion that:
  analyzes the dataset and one or more relationships between the plurality of data; or
  identifies the one or more utility constraints from one or more functional dependencies between one or more data fields to identify.

17. The computer program product of claim 13, further including an executable portion that:
  replace the selected data with anonymized data according to the one or more data security policies or rules; or
  filter the selected data relating to a write operation or a read operation according to the one or more data security policies or rules.

* * * * *